United States Patent [19]

Berglund

[11] Patent Number: 5,233,940

[45] Date of Patent: Aug. 10, 1993

[54] PIGLET PROTECTION APPARATUS

[75] Inventor: Andrew L. Berglund, Northfield, Minn.

[73] Assignee: Zonco, Inc., Northfield, Minn.

[21] Appl. No.: 869,446

[22] Filed: Apr. 16, 1992

[51] Int. Cl.⁵ .............................................. A01K 1/02
[52] U.S. Cl. ...................................... 119/20; 119/903; 119/159; 239/DIG. 21
[58] Field of Search ................ 119/20, 159, 160, 903; 239/207, 550, 589, 596, 597, DIG. 21

[56] References Cited

U.S. PATENT DOCUMENTS

| | | | |
|---|---|---|---|
| 1,628,118 | 5/1927 | Coles | 239/550 |
| 1,651,887 | 12/1927 | Hawes | 239/596 |
| 1,760,359 | 5/1930 | Hiss | 239/550 |
| 3,221,708 | 12/1965 | Marley | 119/159 |
| 3,606,159 | 9/1971 | Sutton | 239/DIG. 21 |
| 3,831,852 | 8/1974 | Stillman, Jr. | 239/207 |
| 4,145,993 | 3/1979 | Notarianni et al. | 119/20 |
| 4,185,581 | 1/1980 | Tilton | 119/159 |
| 4,270,702 | 6/1981 | Nicholson | 239/597 |
| 4,428,324 | 1/1984 | Salminen | 119/20 |
| 4,651,677 | 3/1987 | de Wit et al. | 119/20 |
| 4,700,661 | 10/1987 | Lawson | 119/20 |
| 4,793,287 | 12/1988 | Hofmann | 119/20 |

FOREIGN PATENT DOCUMENTS

| | | | |
|---|---|---|---|
| 3150442 | 6/1983 | Fed. Rep. of Germany | 119/159 |
| 8902212 | 4/1991 | Netherlands | 119/20 |
| 2083334 | 3/1982 | United Kingdom | 119/159 |

Primary Examiner—Robert P. Swiatek
Assistant Examiner—Todd E. Manahan
Attorney, Agent, or Firm—Leone & Moffa

[57] ABSTRACT

In a pre-weaned piglet protector, sharp bursts of compressed air from dome shaped nylon air nozzles located one foot away from each other longitudinally in a farrowing area are used to irritate baby piglets. The farrowing area has a safety zone where the sow cannot sit. The area beneath the sow is covered by these sharp bursts of air. The nozzles keep bursts of air away from the baby pigs in the safety zone so they have a tendency to move to the safety zone to avoid the irritation of the air bursts. The air bursts are of a pressure and duration which is uncomfortable for the baby piglets but not sharp enough to cause any harm. The bursts of air are under the control of a controller which opens and closes the air solenoid with precisely metered intervals. The controller is activated by a diffuse reflection photoelectric sensor switch that hangs directly above the sow and detects her inclinations. When the sow gets up the sensor switch activates the controller which sends a pulsing signal to the air solenoid valve. The air solenoid valve then opens to allow pulsing high velocity bursts of air to exhaust out of the orifices of the nozzles and discourage the baby piglets from staying in the danger zone.

10 Claims, 6 Drawing Sheets

PIGLET PROTECTION APPARATUS

This invention relates to an apparatus and method for protecting pre-weaned piglets, and more particularly to a method of irritating the piglets while under the sow thereby causing them to move from the danger zone to a safety zone.

BACKGROUND OF THE INVENTION

Pre-weaned pig mortality, as a result of being crushed by the sow in a farrowing area, accounts for a 6% to 9% loss of all pigs that are farrowed. This loss translates into reduced potential profits for the pork producer.

Conventional farrowing areas are usually equipped with safety zones for the pre-weaned piglets. The safety zones are separated from the farrowing area with a safety bar. The safety bar is just high enough for the pre-weaned pigs to walk underneath. It is usually equipped with a mat and a heat lamp that attracts the pre-wean pigs to the safety zone.

Conventional methods of crush prevention employ the use of additional steel bars in the farrowing area to further restrict the sow, or to slow her descent as she lies down. These methods all attempt to improve the pre-weaned pigs' chances of escaping when the sow is descending upon them. These methods are nominally successful at best. There have been some reported instances where the additional steel bars have caused harm to the sow.

Prior art devices for crush prevention include a portable pig sitter from a Denmark firm which is described in a publication by E. K. Brapps and M. G. Hogberg from the Animal Science Department at Michigan State University. The portable pig sitter, as described in the Brapps and Hogberg article, slips over the side of a farrowing crate on the same side as a heat source which is used to attract the baby pigs. The unit works with an electric eye beaming across the farrowing crate to detect the sow's inclination. When the sow stands the electric eye's beam is broken triggering a fan in the unit. The fan pushes cool air into the farrowing area. This creates an uncomfortable environment under the sow but, in view of the results, does not appear to irritate the piglets enough to afford them protection. The baby pigs purportedly avoid this area and thereby theoretically avoid crushing when the sow lays down. The results of the article indicate that the portable pig sitter does not effectively prevent pre-weaned piglet death. According to the survey the following paragraph describes the results and discussion of the portable pig sitter.

A summary of pig numbers and weights is given in Table 1. There were no significant differences between the control and treatment groups in any of the parameters examined. The use of the portable pig sitter tended to improve slightly the number of pigs alive at 3 days and 21 days. Average 21 day weights also showed some improvements. Death losses from days 1-3 also showed a tendency toward improvement with use of the portable pig sitter. The percentage of death losses due to crushing or overlaying show a reduction in the treatment group (17.6% of losses) over the control group (70.8% of losses). However, the percentage of losses due to starvation, runts or miscellaneous causes were higher in the treatment group (29.4, 35.2 and 17.6%, respectively) over that of the control groups (12.5, 12.5, and 4.2, respectively). This shift of reduced death due to crushing and increased death due to other causes may suggest that the weak pigs were able to avoid being crushed in treatment groups, but later died from other causes whereas the weak or starved pigs in the control group may have continued to stay as close as possible to the sow while she was standing, possibly for warmth or trying to nurse at the next opportunity and these were crushed. Parity significance was examined but no differences were noted.

TABLE 1

| Parameter | Treatment | Control |
| --- | --- | --- |
| No. litters | 29 | 31 |
| No. pigs born | 299 | 332 |
| No. pigs born/litter | 289 | 310 |
| Ave. no. born/litter | 10.31 | 10.71 |
| Ave. no. born alive/litter | 9.96 | 10.00 |
| % stillborn | 3.34 | 3.15 |
| Ave. pig wt. at birth, lb. Per litter | 3.28 | 3.15 |
| No. pigs, day 1 | 9.96 | 10.0 |
| No. pigs, day 3 | 9.69 | 9.35 |
| No. pigs, day 21 | 9.20 | 8.84 |
| Litter wt., day 1, lb. | 32.51 | 31.02 |
| Litter wt., day 3, lb. | 37.72 | 36.26 |
| Litter wt., day 21, lb. | 121.08 | 112.71 |
| Ave. litter wt. gain, lb. | 88.57 | 81.69 |
| Ave. pig wt., day 1, lb. | 3.28 | 3.15 |
| Ave. pig wt., day 3, lb. | 3.89 | 3.87 |
| Ave. pig wt. gain, lb. | 9.82 | 9.60 |
| Death loss, day 1-3 | 17 (5.68%) | 24 (7.74%) |
| Death loss, day 4-21 | 13 (4.35%) | 16 (5.15%) |

As a result of the failure of prior art methods there exists a need for a safe and pro-active method that virtually eliminates crushing of pre-weaned piglets resulting by a descending sow. It is also desirable to accomplish this result without restricting access to the sow.

The solution to the aforesaid problem should advantageously also encourage the pre-wean pigs to stay in the safety zone, but more importantly, discourage them from wandering under the sow in the danger zone during the entire time the sow is standing since pre-weaned pigs are creatures of comfort. They are attracted to a comfortable environment and stay away from an uncomfortable environment.

It is therefore the motivation of the invention to provide a safe and effective means of preventing pre-weaned piglet mortality by providing a local irritant to chase the pre-weaned piglets from the danger zone under the sow to the more comfortable environment afforded by the safety zone.

SUMMARY OF THE INVENTION

The invention provides a pre-weaned piglet protector that utilizes an air compressor to compress air into an air manifold. The air manifold distributes the compressed air through a branched air supply to electronically controlled air solenoids. The compressed air leaves the solenoids in metered bursts and is routed directly to one or more air nozzles. The nozzles are positioned longitudinally in the center of the farrowing crate floor. A proximity sensor switch controls the electronic air solenoid to provide metered bursts of high pressure air that shoots out from the nozzles in the center of the farrowing stall to chase and irritate the pre-weaned piglets from under the sow, and keep them located in a safety zone during the time that the sow is standing up.

It is an object of the invention to reduce pre-weaned pig mortality.

It is yet a further object of the invention to prevent a sow from lying down on her piglets by chasing them out from under her and keeping them away for the entire time that the sow is standing up.

It is yet another object of the invention to provide a pre-weaned piglet protector apparatus that can be used in a farrowing room with more than one sow.

It is yet another object of the invention to provide an improved nozzle manifold for use in a pre-weaned piglet protector apparatus.

It is a further object of the invention to provide the nozzle manifold designed with various bottom side contours so that they may be adopted to fit any conventional pre-existing farrowing crate flooring.

It is a further object of the invention to provide the air manifold and air branch supply in a low profile configuration such that the air supply going to the nozzles can be installed under the floor of a farrowing area.

It is yet a further object of the invention to exploit the fact that pre-weaned piglets are creatures of comfort and would prefer to stay away from high speed bursts of compressed air.

Other objects, features and advantages of the present invention will become apparent to those skilled in the art through the description of the preferred embodiment, claims and drawings herein where like numerals refer to like elements.

DETAILED DESCRIPTION OF THE PREFERRED EMBODIMENT

Figure 1A:
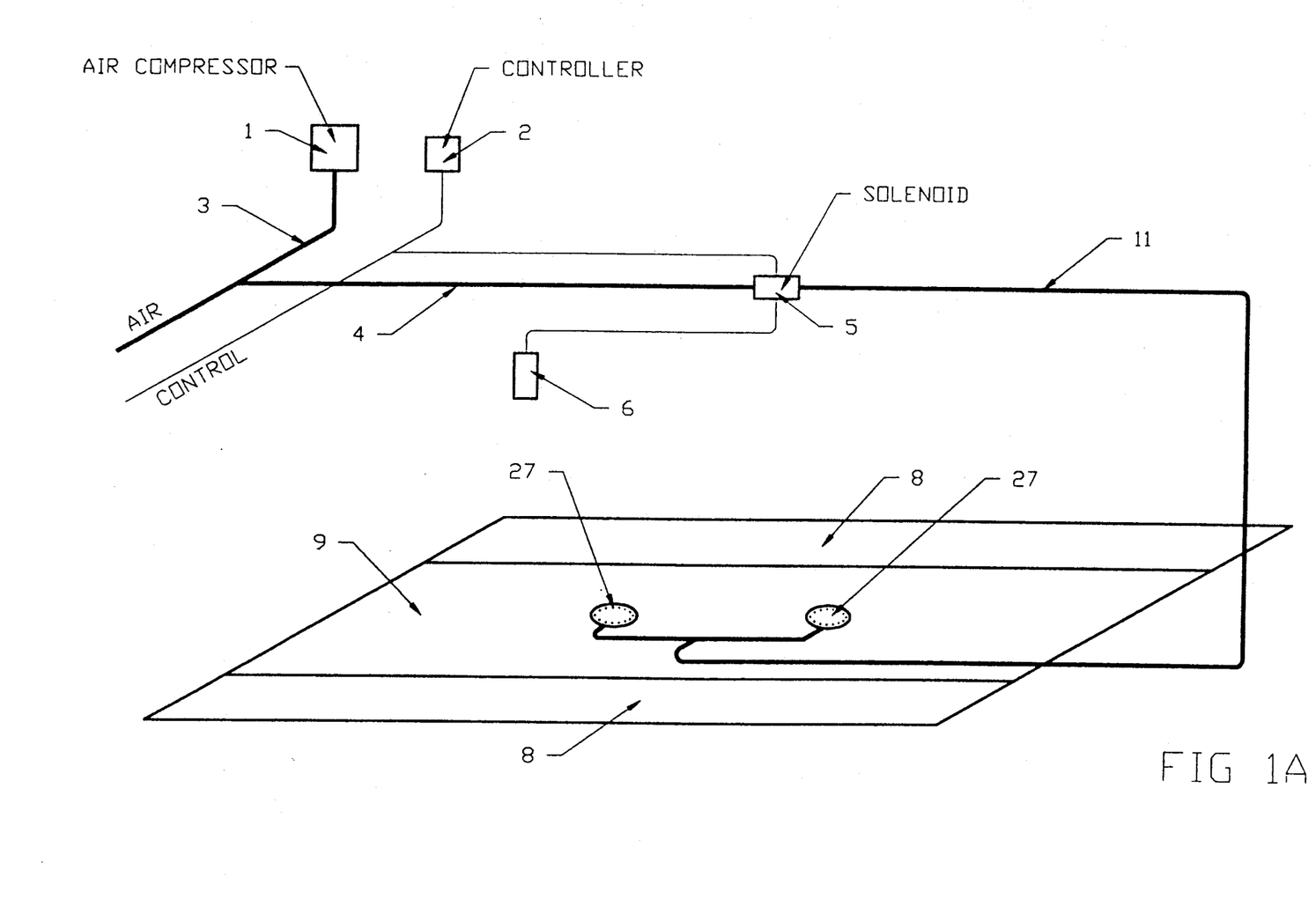
FIG. 1A shows the apparatus of the invention used in a farrowing stall.

Referring now to FIG. 1A which shows the apparatus to protect pre-weaned piglets according to the method of the invention. Farrowing area 9 is equipped with safety zones 8. The sow is restricted from entering the safety zones 8 by bars (not shown). The objective of the invention is to chase the pre-weaned piglets from the farrowing area 9 to the safety zones 8 and keep them there while the sow remains standing in the farrowing area 9. The invention accomplishes this by discharging high pressure bursts of air from the center of the farrowing crate floor fanning outward and upward toward the safety zones 8. The farrowing area 9 has a number of components installed in its floor. Air nozzles 27 are powered by high pressure air under pulsating control. Pulsating high pressure air line 11 provides air nozzle 27 with the air supply to chase the piglets from the farrowing area 9. The high pressure air supply 11 is controlled via solenoids 5 which are activated by the proximity sensor switch and are controlled by a controller 2. In one embodiment of the invention each air nozzles 27 or a group of nozzles in a farrowing crate has a control solenoid 5.

High pressure air is provided to the air supply 11 through branch air supply 4. Branch air supply 4 is connected to air manifold 3 which is powered by an air compressor 1. A sow proximity sensor switch 6 is provided which is connected to solenoid 5. The control law used by the controller 2 implements a simple algorithm. If the sow is standing, she is detected by the proximity sensor switch 6. The nozzles respond to the sensor by providing high pressure bursts of air to the farrowing area 9. When the sow is sitting the proximity sensor switch 6 switches off the solenoid 5 which stops the high pressure bursts of air from getting to the nozzles and the piglets are allowed to comfortably enter the farrowing area 9.

Figure 1B:
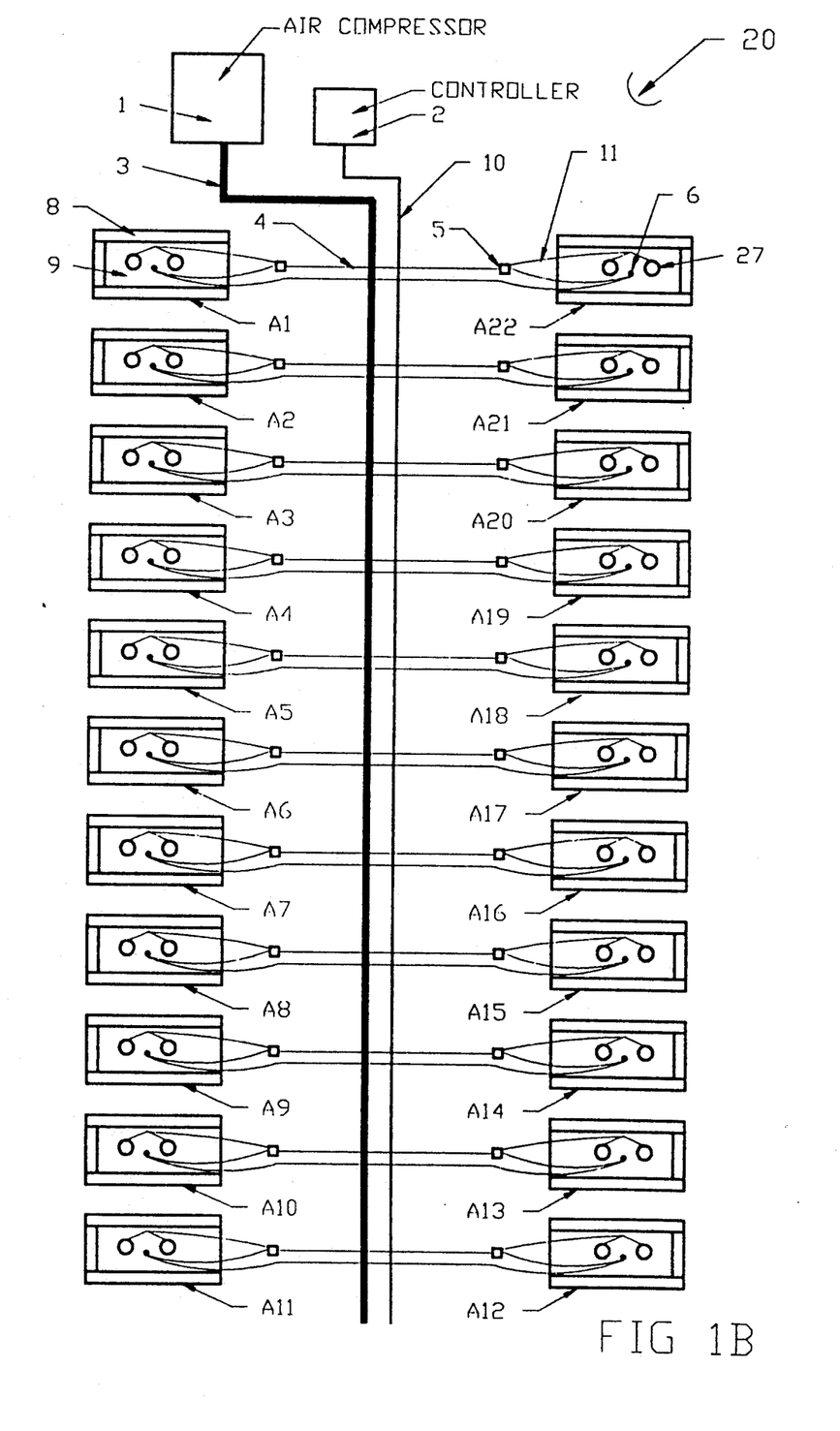
FIG. 1B shows the apparatus of the invention used in a farrowing room with a number of farrowing areas.

Referring now to FIG. 1B which shows a floor plan and schematic diagram of the pre-weaned piglet protector apparatus of the invention used in a farrowing room 28. The farrowing room 28 is shown with twenty-two farrowing areas labeled A1-A22. Each farrowing area A1-A22 is equipped with an apparatus of the invention.

The farrowing room 28 contains an air compressor 1 which is used to supply an air manifold 3 with high pressure air. Those skilled in the art will recognize that other compressed air sources can be used in place of the air compressor 1 and that the use of the air compressor 1 is by way of example and not limitation.

The air compressor 1 is used to power the air nozzles 27 which appear in each farrowing area A1-A22. The air manifold 3 is used to supply branch air supplies 4 with compressed air. Each branch air supply 4 supplies an air solenoid 5. When the air solenoid 5 is activated by the proximity sensor switch 6 the air solenoid 5 supplies air line 11 with compressed bursts of air. The compressed air is fed from line 11 to one or more air nozzles in each farrowing area which provides bursts of high pressure air to the floor of the farrowing area only when the sow is standing up.

The air supply is controlled by an electronic air solenoid valve 5 which has a control distribution line 10 which is controlled by a controller 2. The electronic controller can optionally be an analog or digital implementation. Each farrowing area also has equipped with it a proximity sensor switch 6 which locates the sow and detects her inclination in the farrowing area. The proximity sensor switch 6 turns on and off the signal coming from the controller to the solenoid.

The apparatus of the invention is powered with an air compressor 1, shown in FIG. 1B, capable of delivering 100 p.s.i. to each crate A1-A22. The invention is not limited to 22 crates, and those skilled in the art will recognize that other numbers of crates may be used without deviating from the scope of the invention. The air compressor size is determined by the number of farrowing areas in service. The compressed air is piped to the individual farrowing areas A1-A22 through what in one embodiment of the invention is an over-head manifold system. Each crate A1-A22 requires a branch in the manifold 3. Each branch air supply 4 ends directly above the crate, where it connects to an electric air solenoid valve 5.

The air solenoid valve 5 is operated by a controller 2, which is a solid state control unit that automatically controls the amount of time the solenoid valve 5 is open and closed. Controller 2 adjusts the amount of air that bursts out of the air nozzle 27, when the air solenoid valve 5 is open, and the amount of time between each burst. It is important to be able to precisely control the flow of air to each air nozzle 27. Air that is pulsed creates a more uncomfortable environment than air that is running evenly and continuously. In one example of the invention the air may be pulsed on for about 0.2 of a second at a rate of about once per second. Other timing may also be effective depending upon the pressure, size of the farrowing area and other factors. A smaller and less expensive air compressor is required to deliver 100 p.s.i. to a pair of nozzles being pulsed intermittently than if they were exhausting air continuously. The solid state control unit 2 in one preferred embodiment of the invention is capable of operating hundreds of air solenoid valve's simultaneously. Control unit 2 may be constructed in accordance with well known control design techniques familiar to those skilled in the art.

Figure 2A:
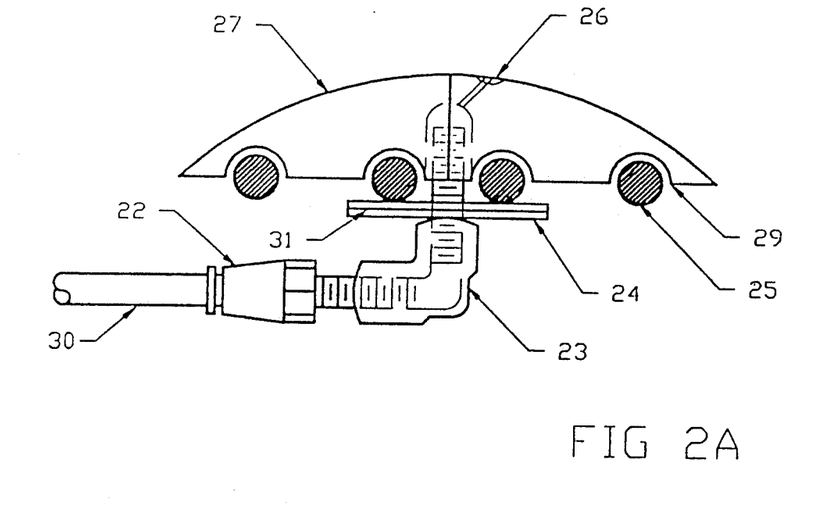
FIGS. 2A and 2B show side and top views respectively of a nozzle used in one example of the apparatus of the invention.

Now referring to FIG. 2A which shows a preferred embodiment of one high pressure air nozzle of the method and apparatus of the invention. The high pressure nozzle manifold 27 is positioned over steel rod flooring 25. Those skilled in the art will recognize that other flooring styles or designs can be used in place of steel rod flooring 25, and that the use of steel rod flooring 25 is by way of example and not limitation. The nozzle manifold 27 is advantageously a smooth dome to prevent injury to the baby piglets and mother sow. The nozzle orifice 26 is shown at the top of the nozzle manifold 27 oriented at 23 degrees from the horizontal. This angle may vary from site to site depending on the geometry of the site. The nozzle manifold 27 is secured to steel rod flooring 25 by securing washers 24 fastened by a 90 degree brass fitting 23. The steel rod flooring 25 is sandwiched between the nozzle manifold 27 and washers 24. A 90 degree fitting 23 is used to provide a low profile connection to the nozzle manifold 27. The 90 degree fitting 23 is connected to the air solenoid valve by high pressure air line tubing 30 through tube fitting 22.

The preferred embodiment of the washers 24 advantageously features a top washer 31, which affixes to the bottom of the farrowing floor to be serrated with anti-slip teeth on its top side. This will help to prevent the air nozzle 27 from moving when it is bolted down tightly. Those skilled in the art will recognize this as a lock washer, and there are several types of lock washers. The invention is not limited to any particular kind of nozzle retaining method.

Figure 2B:
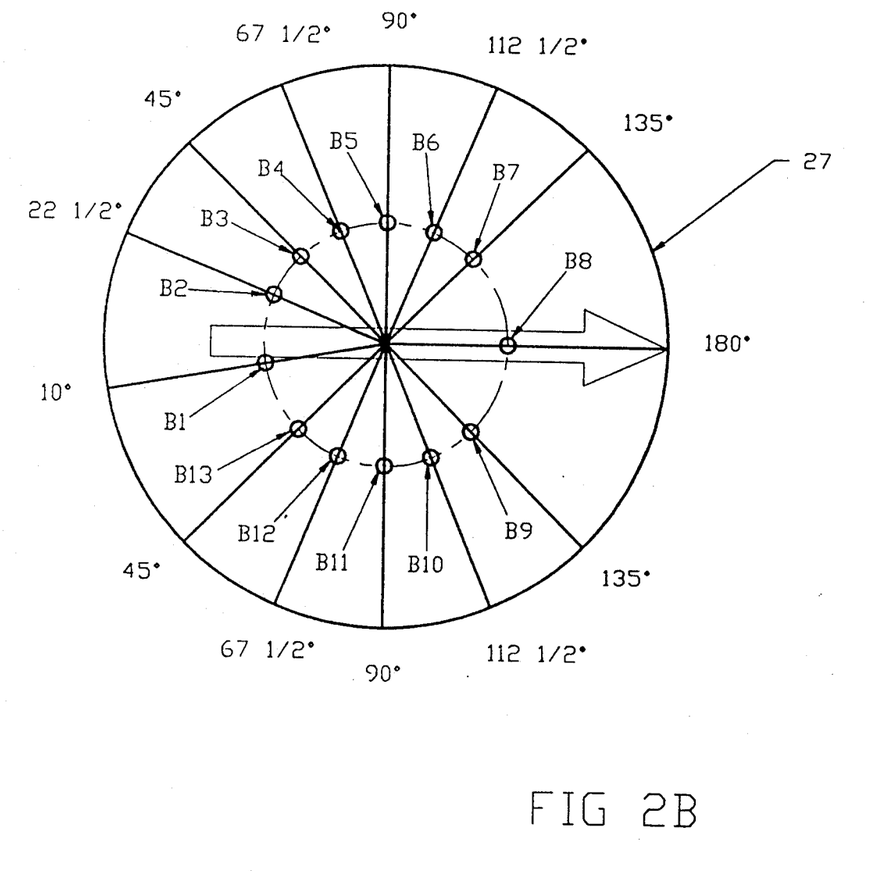

Now referring to FIG. 2B which shows the high pressure air nozzle in a top down schematic view. The high pressure air nozzle 27 is shown with a number of small orifices B1-B13 which provide a radial distribution of high pressure air. The orifices B1-B13 in the apparatus of FIG. 2A are drilled at 10 degrees, 22½ degrees, 45 degrees, 67½ degrees, 90 degrees, 112½ degrees, 135 degrees, and 180 degrees from the axis of the nozzle 27. Those skilled in the art will recognize that differing air hole patterns could be used and these are given by way of example and not to limited to other angles of orientation. FIG. 2B also shows a 23 degree angle for the air orifice, other angles may be used. The preferred embodiment angle of 23 degrees makes it possible to establish air pulse coverage over the entire area in which the sow can lie down. The same pulsing air is directed over the heads of the piglets when they are in their safety zones. This will generate a condition response effect and actually train the preweaned piglets to stay out of the danger zone when the sow is standing up.

Air solenoid valve 5 in FIG. 1B is connected to the air nozzle 27 in FIG. 2B with high pressure plastic air hoses and brass fittings in one embodiment of the invention. With the air nozzle 27 on the top side of the steel rod flooring 25 in FIG. 2A, and the washers 24 on the 90 degree bottom side, as the brass fittings 23 are screwed into the threaded intake hole of the nozzles, they tighten the air nozzle 27 securely to the steel rod flooring 25. The bottom contour 29 of the air nozzle 27 can be molded to match the contour of any conventional farrowing area floor to a depth of ¼" as shown in the side-view drawing of the air nozzle 27 FIG. 2A. This, along serrated locking washer, prevents the air nozzle 27 from moving horizontally in any direction. The air solenoid valve, air hoses and fittings are commercially available.

Figure 3:
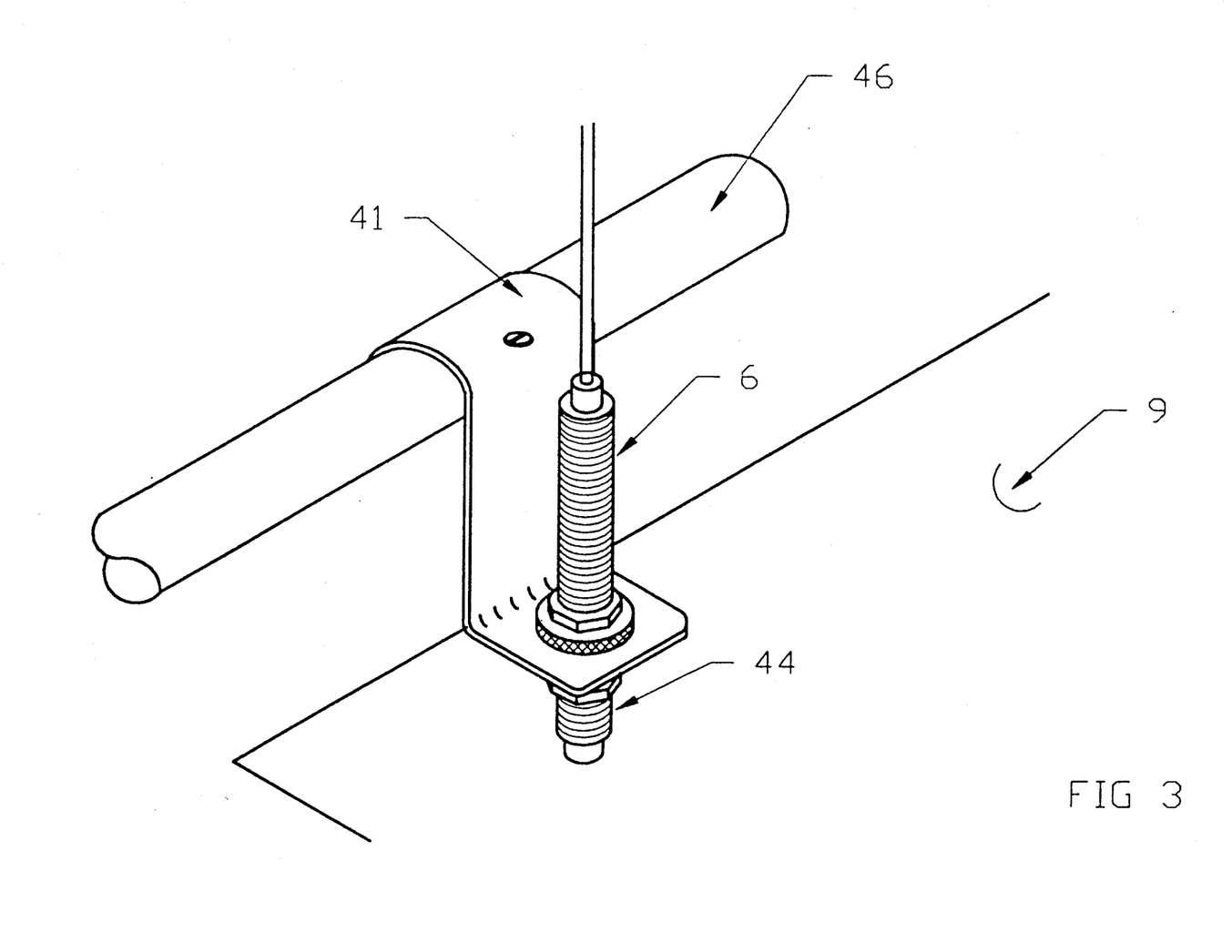
FIG. 3 is a schematic of a proximity sensor used to determine whether the sow is standing up or lying down.

Now referring to FIG. 3 which shows the sow proximity sensor switch and mounting. The switch is shown installed above the sow in the farrowing area 9 in FIG. 1B. The switch is connected to a bracket 41 which holds the threaded sensor 44 on a bar 46 suspended above the farrowing area 9.

The air pulsating signal from the controller 2 is enabled by a commercially available diffuse reflection photo electric sensor (DRPES) switch 6 which hangs directly above the sow and is attached to the top of her farrowing area 9. This sensor sends out a continuous infrared signal. As the sow starts to get up she will rise to within 10-14 inches of the DRPES 6. As soon as she gets within that signal range, the infrared signal will be reflected off her and back to a built-in receiver in the DRPES 6 which then triggers the air solenoid valve 5 to be activated by the control unit 2 in a well known manner. As a result the air begins to pulse out of the air nozzles 27 in metered bursts. As soon as the sow lies down and gets out of range, the infrared signal is no longer reflected back to the diffuse reflection photo electric switch 6, and the air solenoid valve 5 is switched off from the controlling unit 2. As a result the metered busts of air immediately stop. Those skilled in the art will recognize that other types of switches such as contact switches, optical switches or ultrasonic switches may also be used.

Figure 4:
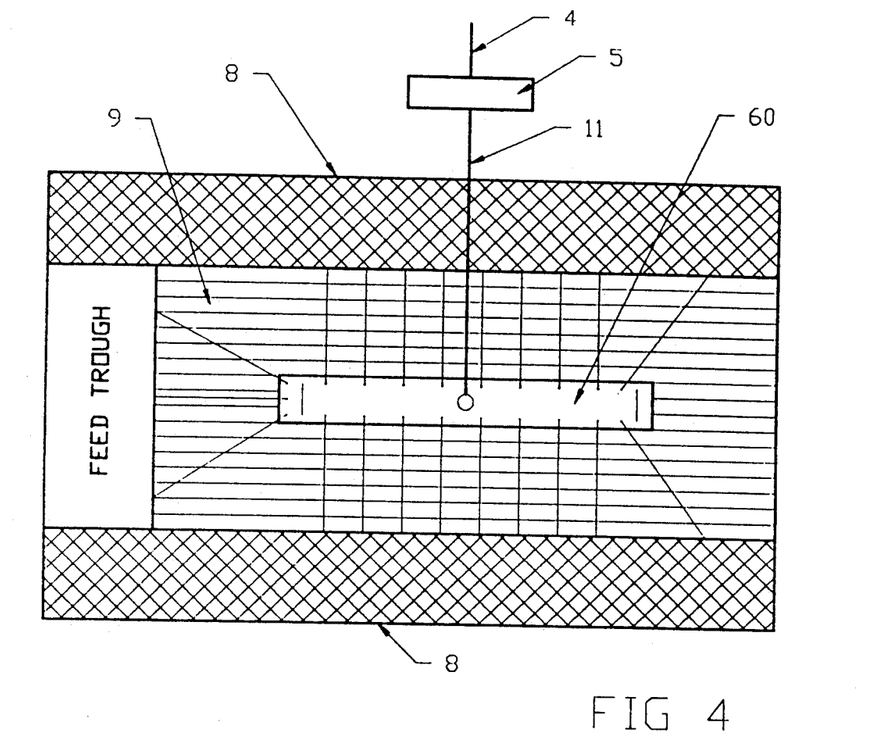
FIG. 4 shows a floor plan of the air nozzle coverage in a farrowing area.

Now referring to FIG. 4 which shows a floor plan of one example of air nozzle coverage in a farrowing area 9 using a tubular air manifold 60. The air nozzle coverage must be complete enough to safely direct the pre-weaned piglets away from the area that the mother sow will likely lie down on to rest. This requires an effective yet safe distribution of high pressure air in the farrowing area 9.

The pre-weaned piglets are chased by the irritating high pressure bursts of air to the safety zones 8. The apparatus of the invention accomplishes this by uniformly distributing high pressure bursts of air away from the farrowing area 9 where the sow is likely to lie down on to rest and toward the safety zones 50 and 51. Air manifold 60 is attached to the high pressure air supply 4 through solenoid valve 5 that pulses the air supply 11. The high pressure manifold has a number of holes drilled in it to provide a uniform distribution of high pressure pulsed air in the farrowing area 9. Those skilled in the art will recognize that the manifold could be of alternate shapes and sizes and the holes drilled in the manifold 60 are intended to provide a uniform coverage of high pressure air in the direction of the safety zone from the farrowing area 9, the objective being to direct the pre-weaned piglets from under the area where the sow can lie down to rest.

Figure 5:
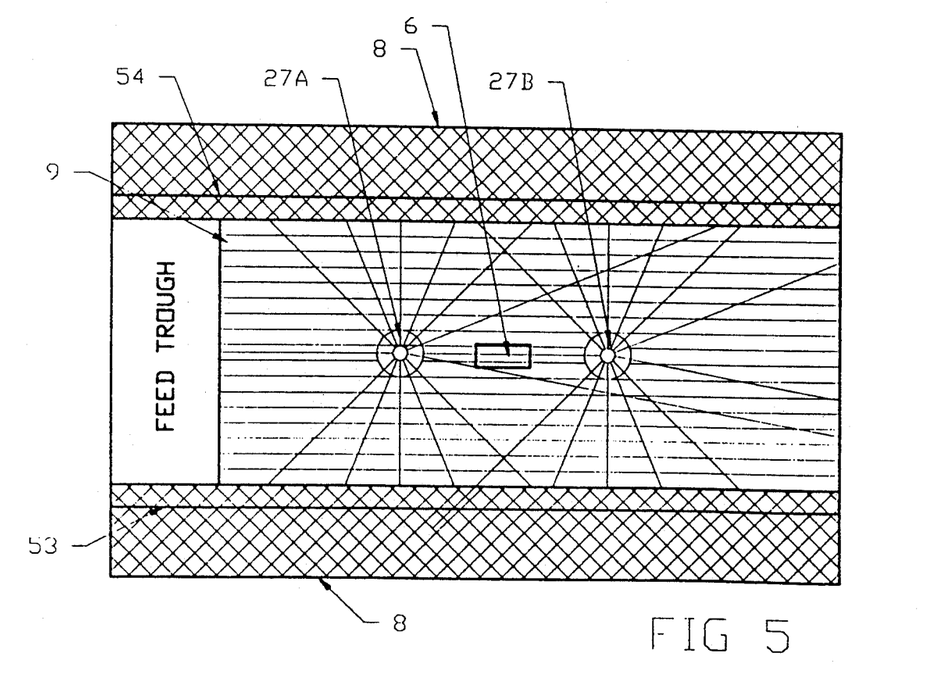
FIG. 5 shows an alternate floor plan coverage for air nozzles in a farrowing area.

Now referring to FIG. 5 which shows an alternate floor plan for an alternate air nozzle for use in the farrowing area 9. Using the nozzles of FIGS. 2A and 2B a slightly different pattern can be utilized to accomplish essentially the same objective, that of chasing the pre-weaned piglets out from under the sow when she is standing up. The radial air nozzles 27A and 27B direct high pressure air bursts away from the center of the farrowing area 9 toward the safety zones 50 and 51. The pre-weaned piglets will move away from and in the direction of high pressure air bursts and to the safety zones.

In one preferred embodiment of the invention the controller 2 pulses sharp bursts of compressed air from two dome-shaped nylon air nozzles 27A and 27B located about 12" away from each other, longitudinally in the center of the farrowing area 9. The area beneath the sow is substantially covered by these sharp bursts of air from nozzles 27A and 27B. The horizontal exhaust angles of 13 separate orifices in each nozzle are carefully chosen for maximum coverage as shown in FIG. 5. The air nozzles 27A and 27B are designed so that the air exhausts from the orifices at a 23 degree vertical angle as shown in FIG. 2A. The angle prevents the air from hitting the baby pigs while in the safety zone. The air is aimed to go over the piglets' heads when they are in the safety zones 50 and 51. As soon as they go under the safety bars 53 and 54 and enter the danger zone farrowing area 9, they receive a sharp burst of air in their faces. The air bursts are uncomfortable, but not sharp enough to cause harm to the piglets.

In contrast to FIG. 5, the tube manifold 60 of FIG. 4 operates as a longitudinal manifold and delivers bursts of air on the same principle as the dome shaped air nozzle 27. The bursts of air do not have to travel as far from the nozzle orifices of the tube manifold 60 in order to achieve the same coverage as they do with the dome shaped air nozzle 27. Tubular manifold 60 does not experience as much resistance from the ambient air. The result is that the speed of the air bursts is more consistent over the intended area of coverage using one tubular manifold 60 than it is by using two dome shaped air nozzles 27.

Figure 6:
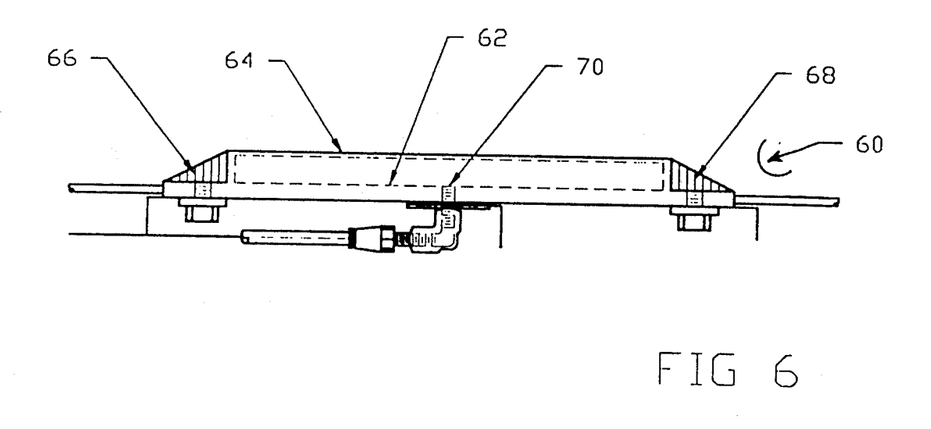
FIG. 6 shows a side view of the nozzle tube.
Figure 7:
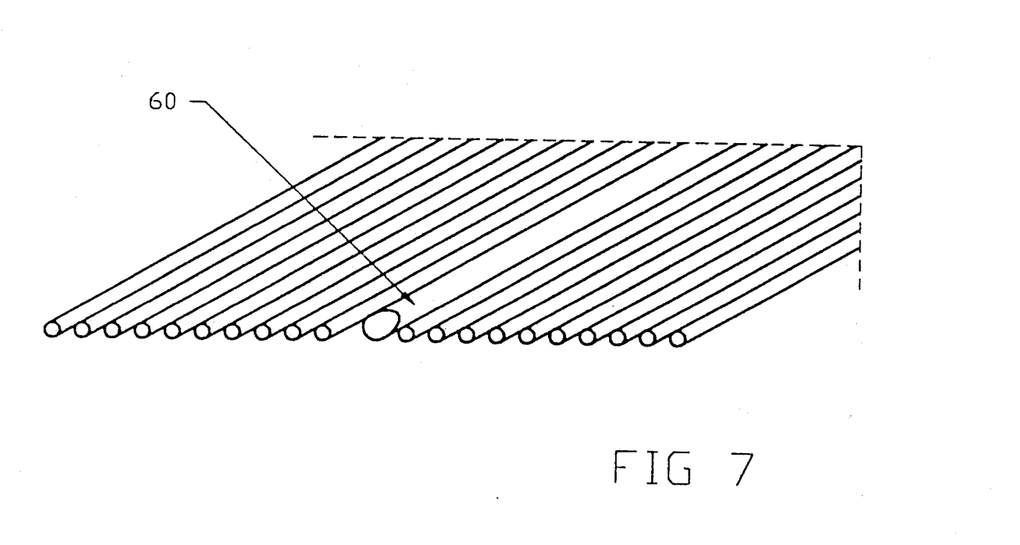
FIG. 7 shows a cross section end view of the tube nozzle.

Now referring to FIGS. 6 and 7 which show a schematic drawing of the tube nozzle. The tube manifold 60 advantageously comprises ¾ D nylon, with a ¼" hole 62 running length wise. It has a wall 64 thickness of ¼", but is not limited to that material nor those dimensions. Both ends 66 and 68 are sealed and bevelled to conform with the contour of the existing steel rod floor 25. The bottom of the tube manifold 60 is drilled and taped at both ends and in the middle. The holes at the ends are sealed and bolted to the crate floor support members. The middle hole 70 is used to accommodate the same kind of brass fittings used, for the air intake connection of the dome shaped air nozzle 27 of FIG. 2A. The orifices are drilled at the 23 degrees but not limited to that angle, and spaced to achieve maximum air coverage with the least number of orifices. In one preferred embodiment of the invention there are 22 orifices.

The invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A piglet protector apparatus for use in a farrowing area, wherein the farrowing area has a safety area and a sow resting area, and wherein the sow resting area includes a slotted floor, the apparatus comprising:
   a. air compressor means for providing high pressure air;
   b. a sow proximity sensor switch, located proximate the farrowing area, for detecting whether a sow is in a sitting or standing position, the sow proximity sensor switch generating a sensor signal responsive to the sow position;
   c. a solenoid control means, connected to the sow proximity sensor switch, for providing a solenoid control signal in response to the sensor signal;
   d. air nozzle control means for controlling high pressure air flow, the air nozzle control means is connected to the solenoid control means to receive the solenoid control signal, the air nozzle control means also includes an air inlet connected to the air compressor means, and the air nozzle control means transmits high pressure air in response to the solenoid control signal; and
   e. air nozzle means for spraying high pressure air, the air nozzle means is located substantially in the center of the slotted floor and includes an air supply fitting connected to receive high pressure air from the air nozzle control means, the air nozzle means further comprises a dome shaped dispersion manifold means for distributing air, the dispersion manifold means having a plurality of small air orifices arranged radially around a center axis, the plurality of small air orifices are connected to receive high pressure air from the air supplying fitting, and the air supply fitting also conformingly connects the dispersion manifold means to the slotted floor, the air nozzle means operates under control of the air nozzle control means so as to spray high pressure air through the plurality of small air orifices when the sow is standing so as to irritate piglets proximate the sow resting area.

2. The piglet protector apparatus of claim 1 wherein the sow proximity sensor switch comprises a diffuse reflection photoelectric sensor switch.

3. The piglet protector apparatus of claim 1 wherein the plurality of small air orifices are drilled into the dispersion manifold at a 23 degree angle of inclination to the slotted floor and are arranged in a pattern locating air orifices at 10 degrees, 22½ degrees, 45 degrees, 47 degrees, 67½ degrees, 90 degrees, 112½ degrees, 135 degrees, and 180 degrees from the center axis of the dispersion manifold.

4. The piglet protector apparatus of claim 1 wherein the air nozzle means comprises at least two air nozzles mounted along a center line on the slotted floor.

5. The piglet protector apparatus of claim 1 wherein the air nozzle means comprises a plurality of air nozzles mounted in the slotted floor.

6. The piglet protector apparatus of claim 1 wherein the solenoid control signal is a timing signal and the sow proximity sensor switch comprises a photoelectric sensor switch which switches to interrupt the timing signal from the solenoid control means.

7. The piglet protector apparatus of claim 1 wherein the sow proximity sensor switch comprises an electro-optic proximity sensor suspended above the sow.

8. The piglet protector apparatus of claim 1 wherein the air nozzle means provides metered bursts of high pressure air directed only on a danger zone by directing the metered bursts of air at a 23 degree angle outwardly from the center of the slotted floor.

9. The pigment protector nozzle of claim 1 wherein the dispersion manifold has a very low profile so as not to be a source of injury to the sow and piglets.

10. The pigment protector nozzle of claim 1 wherein the air supply fitting provides a low profile air connection to the dispersion manifold so as to securely fasten the dispersion manifold to the slotted floor.

* * * * *

UNITED STATES PATENT AND TRADEMARK OFFICE
CERTIFICATE OF CORRECTION

PATENT NO. : 5,233,940
DATED : 08/10/93
INVENTOR(S) : ANDREW L. BERGLUND

It is certified that error appears in the above-identified patent and that said Letters Patent is hereby corrected as shown below:

Claim 9, Col. 9, line 9; change "pigment" to --piglet--.
Claim 10, Col. 10, line 4; change "pigment" to -- piglet --.

Signed and Sealed this

Tenth Day of May, 1994

Attest:

BRUCE LEHMAN

Attesting Officer     Commissioner of Patents and Trademarks